United States Patent
Hirose et al.

(10) Patent No.: US 9,724,652 B2
(45) Date of Patent: Aug. 8, 2017

(54) COPOLYMER AND CARBON DIOXIDE GAS SEPARATION MEMBRANE

(71) Applicant: SUMITOMO CHEMICAL COMPANY, LIMITED, Tokyo (JP)

(72) Inventors: Kenichi Hirose, Suita (JP); Hayato Sugiyama, Osaka (JP); Takehiro Nakasuji, Osaka (JP); Shinichi Furukawa, Osaka (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 0 days.

(21) Appl. No.: 14/436,969

(22) PCT Filed: Oct. 18, 2013

(86) PCT No.: PCT/JP2013/078885
§ 371 (c)(1),
(2) Date: Apr. 20, 2015

(87) PCT Pub. No.: WO2014/065387
PCT Pub. Date: May 1, 2014

(65) Prior Publication Data
US 2015/0283518 A1    Oct. 8, 2015

(30) Foreign Application Priority Data

Oct. 22, 2012 (JP) .................. 2012-232586

(51) Int. Cl.
*B01D 53/22* (2006.01)
*B01D 71/36* (2006.01)
(Continued)

(52) U.S. Cl.
CPC .......... *B01D 71/36* (2013.01); *B01D 53/228* (2013.01); *B01D 53/62* (2013.01);
(Continued)

(58) Field of Classification Search
CPC ...... B01D 71/36; B01D 53/228; B01D 53/62; B01D 67/0009; B01D 69/12;
(Continued)

(56) References Cited

U.S. PATENT DOCUMENTS

| 5,445,669 | A | | 8/1995 | Nakabayashi et al. |
| 5,620,500 | A | * | 4/1997 | Fukui ................ B01D 53/22 95/52 |

(Continued)

FOREIGN PATENT DOCUMENTS

| EP | 2239048 A1 | 10/2010 |
| JP | 7-112122 A | 5/1995 |

(Continued)

OTHER PUBLICATIONS

"Derive" American Heritage Dictionary of the English Language, Fifth Edition. 2011 by Houghton Mifflin; 1 page http://www.thefreedictionary.com/derived.*

(Continued)

*Primary Examiner* — Anthony Shumate
(74) *Attorney, Agent, or Firm* — Sughrue Mion, PLLC

(57) ABSTRACT

The present invention relates to a copolymer containing a constitutional unit derived from acrylic acid cesium salt or acrylic acid rubidium salt and a constitutional unit derived from vinyl alcohol, a resin composition containing the copolymer, a carbon dioxide gas separation membrane which can be manufactured with the resin composition, a carbon dioxide gas separation membrane module having the separation membrane, and a carbon dioxide gas separation apparatus including at least one type of the module.

5 Claims, 1 Drawing Sheet

(51) Int. Cl.

| | | |
|---|---|---|
| *B01D 71/38* | (2006.01) | |
| *C08F 216/06* | (2006.01) | |
| *C08K 3/26* | (2006.01) | |
| *C08L 29/04* | (2006.01) | |
| *B01D 67/00* | (2006.01) | |
| *B01D 69/12* | (2006.01) | |
| *B01D 69/14* | (2006.01) | |
| *B01D 71/76* | (2006.01) | |
| *B01D 53/62* | (2006.01) | |
| *C08F 8/12* | (2006.01) | |
| *C08F 220/06* | (2006.01) | |
| *B01D 71/40* | (2006.01) | |

(52) U.S. Cl.
CPC ......... *B01D 67/0009* (2013.01); *B01D 69/12* (2013.01); *B01D 69/142* (2013.01); *B01D 71/38* (2013.01); *B01D 71/76* (2013.01); *C08F 8/12* (2013.01); *C08F 216/06* (2013.01); *C08K 3/26* (2013.01); *C08L 29/04* (2013.01); *B01D 71/40* (2013.01); *B01D 2251/30* (2013.01); *B01D 2251/606* (2013.01); *B01D 2257/504* (2013.01); *B01D 2311/13* (2013.01); *B01D 2325/10* (2013.01); *C08F 220/06* (2013.01); *Y02C 10/04* (2013.01); *Y02C 10/10* (2013.01); *Y02P 20/152* (2015.11)

(58) Field of Classification Search
CPC ...... B01D 69/142; B01D 71/38; B01D 71/76; B01D 71/40; B01D 2251/30; B01D 2251/606; B01D 2257/504; B01D 2311/13; B01D 2325/10; C08F 8/12; C08F 216/06; C08F 220/06; C08K 3/26; C08L 29/04; Y02P 20/152; Y02C 10/04; Y02C 10/10
See application file for complete search history.

(56) References Cited

U.S. PATENT DOCUMENTS

| | | | | | |
|---|---|---|---|---|---|
| 5,928,792 | A | * | 7/1999 | Moya | B01D 67/0088 427/235 |
| 5,976,380 | A | * | 11/1999 | Moya | B01D 63/061 210/321.75 |
| 6,315,968 | B1 | * | 11/2001 | Quinn | B01D 53/228 423/220 |
| 2003/0131731 | A1 | * | 7/2003 | Koros | B01D 53/22 96/10 |
| 2003/0183575 | A1 | * | 10/2003 | Zeiher | B01D 61/12 210/639 |
| 2005/0271609 | A1 | * | 12/2005 | Fei | A61K 8/042 424/65 |
| 2007/0272614 | A1 | * | 11/2007 | Minhas | B01D 61/246 210/651 |
| 2008/0173179 | A1 | * | 7/2008 | Tandon | B01D 67/0006 96/12 |
| 2009/0018221 | A1 | * | 1/2009 | Klepper | C07C 29/1518 518/703 |
| 2010/0022978 | A1 | * | 1/2010 | Kasai | A61F 13/15658 604/367 |
| 2010/0205856 | A1 | * | 8/2010 | Kubic | B01D 53/62 44/451 |
| 2011/0036237 | A1 | | 2/2011 | Okada et al. | |
| 2012/0048109 | A1 | * | 3/2012 | Chinn | B01D 53/228 95/130 |
| 2013/0052561 | A1 | * | 2/2013 | Hommura | H01M 8/1023 429/483 |
| 2013/0160650 | A1 | * | 6/2013 | Okada | B01D 69/10 96/12 |
| 2013/0199370 | A1 | * | 8/2013 | Okada | B01D 53/228 95/52 |
| 2013/0284022 | A1 | | 10/2013 | Hiraki et al. | |
| 2013/0287678 | A1 | | 10/2013 | Okada et al. | |
| 2013/0287958 | A1 | | 10/2013 | Oouchi | |
| 2014/0352540 | A1 | | 12/2014 | Okada et al. | |
| 2016/0051938 | A1 | * | 2/2016 | Okada | C08F 230/00 423/230 |

FOREIGN PATENT DOCUMENTS

| | | |
|---|---|---|
| JP | 8-229367 A | 9/1996 |
| JP | 8-243364 A | 9/1996 |
| JP | 2008-36463 A | 2/2008 |
| JP | 2008-36464 A | 2/2008 |
| JP | 2009-195900 A | 9/2009 |
| JP | 2011-161387 A | 8/2011 |
| JP | 2012-143711 A | 8/2012 |
| JP | 2013-107076 A | 6/2013 |
| JP | 2014-200767 A | 10/2014 |
| JP | 2014-213219 A | 11/2014 |
| JP | 2014-226650 A | 12/2014 |
| WO | 2009/093666 A1 | 7/2009 |
| WO | 2012/096055 A1 | 7/2012 |
| WO | 2014/157069 A1 | 10/2014 |

OTHER PUBLICATIONS

Los Alamos National Laboratory, "Periodic Table of Elements," 1 pages, retrieved Aug. 7, 2015, http://periodic.lanl.gov/index.shtml.*
Aston Chemical "Acrylate Cesium" May 16, 2016, 1 page, http://www.astonchem.com/pro_result/514118/.*
Butterman et al. "Cesium metal absorbs gases and other impurities in ferrous and nonferrous metallurgy and in the purification of carbon dioxide" USGS 2004 13 pgs http://pubs.usgs.gov/of/2004/1432/2004-1432.pdf.*
Communication dated Apr. 8, 2014 from the Japanese Patent Office in counterpart application No. 2014-506653. 5 pgs.
Extended European Search Report issued Jun. 10, 2016 in counterpart EP Application No. 13848273.2.
Communication dated Feb. 3, 2017, from the Intellectual Property Office of Taiwan in counterpart application No. 102137653.

* cited by examiner

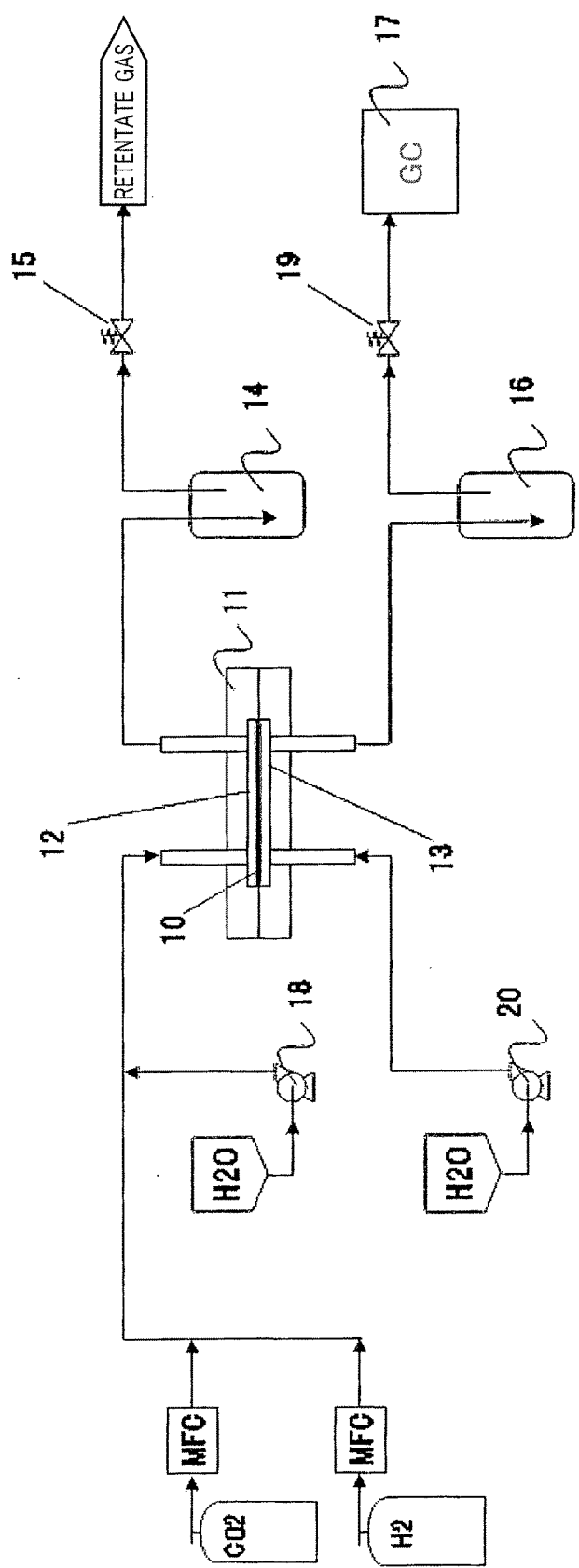

COPOLYMER AND CARBON DIOXIDE GAS SEPARATION MEMBRANE

CROSS REFERENCE TO RELATED APPLICATIONS

This application is a National Stage of International Application No. PCT/JP2013/078885 filed Oct. 18, 2013, claiming priority based on Japanese Patent Application No. 2012-232586 filed Oct. 22, 2012, the contents of all of which are incorporated herein by reference in their entirety.

TECHNICAL FIELD

The present invention relates to a copolymer useful for producing a separation membrane for separating a carbon dioxide gas from a source gas containing the carbon dioxide gas, a resin composition containing the copolymer, a carbon dioxide gas separation membrane which can be manufactured with the resin composition, a carbon dioxide gas separation membrane module having the separation membrane, and a carbon dioxide gas separation apparatus including at least one type of the module.

BACKGROUND ART

PTD 1 describes use of a vinyl alcohol-acrylic acid sodium salt copolymer as a resin useful for producing a separation membrane for separating a carbon dioxide gas from a source gas containing the carbon dioxide gas.

CITATION LIST

Patent Document

PTD 1: Japanese Patent Laying-Open No. 7-112122

The carbon dioxide gas separation membrane obtained by using the copolymer above, however, has not necessarily achieved sufficiently satisfactory carbon dioxide gas permeation performance (permeance).

DISCLOSURE OF THE INVENTION

The present invention includes inventions described in [1] to [11] below.

[1] A copolymer containing a constitutional unit (1) derived from acrylic acid cesium salt or acrylic acid rubidium salt and a constitutional unit (2) derived from vinyl alcohol.

[2] The copolymer described in [1], in which a content of the constitutional unit (2) is from 1 mol % to 90 mol % with respect to a total content of the constitutional unit (1) and the constitutional unit (2).

[3] A resin composition containing a substance reversibly reacting with a carbon dioxide gas and the copolymer described in [1] or [2].

[4] The resin composition described in [3], in which the substance reversibly reacting with the carbon dioxide gas is alkali metal carbonate, alkali metal hydrogencarbonate, or alkali metal hydroxide.

[5] The resin composition described in [3], in which the substance reversibly reacting with the carbon dioxide gas is alkali metal carbonate or alkali metal hydrogencarbonate.

[6] The resin composition described in [3], in which the substance reversibly reacting with the carbon dioxide gas is cesium carbonate, cesium hydrogencarbonate, rubidium carbonate, or rubidium hydrogen carbonate.

[7] The resin composition described in [3], in which the substance reversibly reacting with the carbon dioxide gas is cesium carbonate.

[8] The resin composition described in any one of [3] to [7], in which a content of the substance reversibly reacting with the carbon dioxide gas is within a range from 20 weight % to 90 weight % with respect to a total weight of the substance reversibly reacting with the carbon dioxide gas and the copolymer.

[9] A carbon dioxide gas separation membrane in which a substance reversibly reacting with a carbon dioxide gas and the copolymer described in [1] or [2] are supported by a porous membrane.

[10] A carbon dioxide gas separation membrane module, having the carbon dioxide gas separation membrane described in [9].

[11] A carbon dioxide gas separation apparatus including the carbon dioxide gas separation membrane described in [9] or at least one type of the carbon dioxide gas separation membrane module described in [10].

With the use of the copolymer according to the present invention, a carbon dioxide gas separation membrane excellent in carbon dioxide gas permeation performance (permeance) can be manufactured.

BRIEF DESCRIPTION OF DRAWINGS

FIG. 1 is a schematic diagram of an experiment apparatus for evaluating permeation performance of a carbon dioxide gas separation membrane obtained in each of Examples and Comparative Examples.

DESCRIPTION OF EMBODIMENTS

The present invention will be described hereinafter in detail

<Copolymer and Method of Manufacturing the Same>

A copolymer according to the present invention contains a constitutional unit (1) derived from acrylic acid cesium salt or acrylic acid rubidium salt (hereinafter may be denoted as a "constitutional unit (1)") and a constitutional unit (2) derived from vinyl alcohol (hereinafter may be denoted as a "constitutional unit (2)"). The copolymer according to the present invention may further have a constitutional unit other than the constitutional unit (1) and the constitutional unit (2) (hereinafter may be denoted as a "constitutional unit (3)"). A total content of the constitutional unit (1) and the constitutional unit (2) is preferably from 40 mol % to 100 mol %, more preferably from 50 mol % to 100 mol %, and further preferably from 60 mol % to 100 mol %, with respect to the total content of all constitutional units constituting the copolymer. The total content of the constitutional unit (1) and the constitutional unit (2) can also be exemplified by 80 mol % to 100 mol % with respect to the total content of all constitutional units constituting the copolymer.

The constitutional unit (1) is expressed in a formula (1) below:

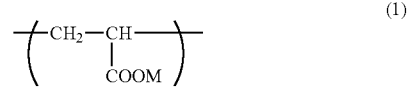

where M represents cesium or rubidium.

For the constitutional unit (1), a constitutional unit derived from acrylic acid cesium salt, that is, such a constitutional unit that M in the formula (1) above is cesium, is preferred.

The constitutional unit (2) is expressed in a formula (2) below.

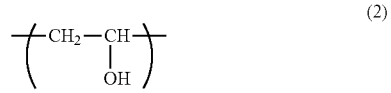

A content of the constitutional unit (2) in the copolymer according to the present invention is preferably from 1 mol % to 90 mol %, more preferably from 5 mol % to 85 mol %, and further preferably from 10 mol % to 80 mol %, with respect to the total content of the constitutional unit (1) and the constitutional unit (2). The content of the constitutional unit (2) in the copolymer according to the present invention can be exemplified by, for example, 1 mol % to 90 mol %, 5 mol % to 85 mol %, 10 mol % to 80 mol %, 20 mol % to 80 mol %, 30 mol % to 80 mol %, 40 mol % to 80 mol %, or 50 mol % to 80 mol %, with respect to the total content of the constitutional unit (1) and the constitutional unit (2).

The constitutional unit (3) is exemplified by, for example: a constitutional unit derived from fatty acid vinyl ester having a carbon number from 2 to 16 such as vinyl acetate, vinyl propionate, vinyl butyrate, vinyl laurate, vinyl caproate, vinyl stearate, vinyl palmitate, or vinyl versatate; a constitutional unit derived from acrylic acid alkyl ester having an alkyl group having a carbon number from 1 to 16 such as methyl acrylate, ethyl acrylate, propyl acrylate, butyl acrylate, hexyl acrylate, octyl acrylate, or lauryl acrylate; a constitutional unit derived from methacrylic acid alkyl ester having an alkyl group having a carbon number from 1 to 16 such as ethyl methacrylate, propyl methacrylate, butyl methacrylate, hexyl methacrylate, octyl methacrylate, or lauryl methacrylate; a constitutional unit derived from maleic acid dialkyl ester having an alkyl group having a carbon number from 1 to 16 such as dimethyl maleate, diethyl maleate, dibutyl maleate, dioctyl maleate, or dilauryl maleate; a constitutional unit derived from fumaric acid dialkyl ester having an alkyl group having a carbon number from 1 to 16 such as dimethyl fumarate, diethyl fumarate, dibutyl fumarate, dioctyl fumarate, or dilauryl fumarate; a constitutional unit derived from itaconic acid dialkyl ester having an alkyl group having a carbon number from 1 to 16 such as diethyl itaconate, dibutyl itaconate, dihexyl itaconate, dioctyl itaconate, or dilauryl itaconate; or a constitutional unit derived from acrylic acid. As the constitutional unit (3), the constitutional unit derived from fatty acid vinyl ester having a carbon number from 2 to 16 or the constitutional unit derived from acrylic acid alkyl ester having an alkyl group having a carbon number from 1 to 16 is preferred, the constitutional unit derived from fatty acid vinyl ester having a carbon number from 2 to 4 or the constitutional unit derived from acrylic acid alkyl ester having an alkyl group having a carbon number from 1 to 4 is more preferred, and the constitutional unit derived from vinyl acetate or the constitutional unit derived from methyl acrylate is further preferred.

The copolymer according to the present invention is obtained with, for example, a manufacturing method including:

(A) a step of saponifying a copolymer containing a constitutional unit derived from acrylic acid alkyl ester and a constitutional unit derived from fatty acid vinyl ester with cesium hydroxide or rubidium hydroxide.

Such a manufacturing method may further include, before the step (A):

(a) a step of polymerizing at least acrylic acid alkyl ester and fatty acid vinyl ester with each other.

Acrylic acid alkyl ester is exemplified by aforementioned acrylic acid alkyl ester having an alkyl group having a carbon number from 1 to 16, and fatty acid vinyl ester is exemplified by aforementioned fatty acid vinyl ester having a carbon number from 2 to 16. Specifically, acrylic acid alkyl ester is exemplified by acrylic acid alkyl ester having an alkyl group having a carbon number from 1 to 16 such as methyl acrylate, ethyl acrylate, propyl acrylate, butyl acrylate, hexyl acrylate, octyl acrylate, or lauryl acrylate, acrylic acid alkyl ester having an alkyl group having a carbon number from 1 to 4 is preferred, and methyl acrylate is more preferred. Fatty acid vinyl ester is exemplified by fatty acid vinyl ester having a carbon number from 2 to 16 such as vinyl acetate, vinyl propionate, vinyl butyrate, vinyl laurate, vinyl caproate, vinyl stearate, vinyl palmitate, or vinyl versatate, fatty acid vinyl ester having a carbon number from 2 to 4 is preferred, and vinyl acetate is more preferred.

Polymerization of the above should only be carried out, for example, in accordance with the method described in Japanese Patent Laying-Open No. 52-107096 or Japanese Patent Laying-Open No. 52-27455.

Saponification in the step (A) is preferably carried out in the presence of water and/or a water-soluble organic solvent (such as an alcohol solvent having a carbon number from 1 to 3). A temperature for saponification is preferably within a range from 20° C. to 80° C. and more preferably within a range from 25° C. to 75° C.

In the step (A), a constitutional unit derived from acrylic acid alkyl ester is saponified to result in the constitutional unit (1), and a constitutional unit derived from fatty acid vinyl ester is saponified to result in the constitutional unit (2). By adjusting a degree of saponification in the step (A) or by neutralization after saponification in the step (A), the copolymer according to the present invention containing the constitutional unit (3) such as the constitutional unit derived from fatty acid vinyl ester, the constitutional unit derived from acrylic acid alkyl ester, or the constitutional unit derived from acrylic acid can be obtained. Here, a degree of saponification represents what percent of an ester structure in a constitutional unit derived form fatty acid vinyl ester or a constitutional unit derived from acrylic acid alkyl ester has been saponified (hydrolyzed).

By adding a compound from which the constitutional unit (3) is derived other than fatty acid vinyl ester and acrylic acid alkyl ester and adjusting an amount of use thereof or a degree of polymerization in the step (a) as well, the copolymer according to the present invention containing the constitutional unit (3) can be obtained.

As above, by selecting as appropriate conditions in the step (A) or the step (a), a content of the constitutional unit (1) and the constitutional unit (2) can be adjusted within the range above.

<Resin Composition and Method of Manufacturing the Same>

The resin composition according to the present invention contains a substance reversibly reacting with a carbon dioxide gas and the copolymer according to the present invention.

A substance reversibly reacting with the carbon dioxide gas can be exemplified by alkali metal carbonate, alkali metal hydrogencarbonate, alkali metal hydroxide, and alkanol amine as described, for example, in Japanese Patent Laying-Open No. 7-112122. As the substance reversibly reacting with the carbon dioxide gas, alkali metal carbonate, alkali metal hydrogencarbonate, or alkali metal hydroxide is preferred, alkali metal carbonate or alkali metal hydrogencarbonate is more preferred, cesium carbonate, cesium hydrogencarbonate, rubidium carbonate, or rubidium hydrogencarbonate is further preferred, and cesium carbonate is still further preferred.

A content of the substance reversibly reacting with the carbon dioxide gas in the resin composition according to the present invention is preferably within a range from 20 weight % to 90 weight % and more preferably within a range from 45 weight % to 85 weight % in a case of cesium carbonate with respect to the total weight of cesium carbonate and the copolymer according to the present invention, although the content is dependent on a type of the substance.

The resin composition according to the present invention is obtained, for example, with a manufacturing method including:

(A) a step of saponifying a copolymer containing a constitutional unit derived from acrylic acid alkyl ester and a constitutional unit derived from fatty acid vinyl ester with cesium hydroxide or rubidium hydroxide; and (B) a step of mixing a substance reversibly reacting with a carbon dioxide gas and the copolymer saponified in the step (A).

The step (A) is as described above. A reaction mixture containing the copolymer obtained in the step (A) may be supplied as it is to the step (B), a reaction mixture obtained in the step (A) may be supplied to the step (B) after it is subjected to post-treatment such as neutralization treatment, a mixture mainly containing the copolymer may be taken out of a reaction mixture obtained in the step (A) by concentration, cooling, or filtration and the taken-out mixture may be supplied to the step (B), or a copolymer obtained by purifying the taken-out mixture with a known method may be supplied to the step (B).

In mixing in the step (B), preferably, water is further mixed. When water is mixed, an amount of use thereof is preferably set to such an amount that the obtained resin composition can be present as a uniform solution when it is supplied to a step (C) which will be described later. An order of mixing in the step (B) is not particularly limited, and a temperature for mixing is preferably within a range from 5° C. to 90° C.

<Carbon Dioxide Gas Separation Membrane and Method of Manufacturing the Same>

In the carbon dioxide gas separation membrane according to the present invention, a substance reversibly reacting with a carbon dioxide gas and the copolymer according to the present invention are supported by a porous membrane. The resin composition according to the present invention being supported by a porous membrane can exemplify the carbon dioxide gas separation membrane according to the present invention.

The porous membrane is exemplified by a porous membrane made of fluoroplastic, polyolefin, a polyamide-based resin, a polysulfone-based resin, ceramics, or a metal, and a porous membrane made of fluoroplastic is preferred. In particular, a porous membrane made of polytetrafluoroethylene (PTFE) is preferred.

The porous membrane preferably has resistance to heat not lower than 100° C., mechanical strength, and adhesiveness with the resin composition according to the present invention. A porous membrane having a porosity not lower than 50% and a pore diameter within a range not smaller than 0.01 µm and not greater than 10 µm is preferred, and a porous membrane having a porosity not lower than 55% and a pore diameter within a range not smaller than 0.1 µm and not greater than 1 µm is further preferred.

The porous membrane is preferably hydrophilic. A stack of a hydrophilic porous membrane and a hydrophobic porous membrane can also be employed.

A method of manufacturing the carbon dioxide gas separation membrane according to the present invention can be exemplified by a method including:

(A) a step of saponifying a copolymer containing a constitutional unit derived from acrylic acid alkyl ester and a constitutional unit derived from fatty acid vinyl ester with cesium hydroxide or rubidium hydroxide;

(B) a step of obtaining a resin composition by mixing a substance reversibly reacting with a carbon dioxide gas and the copolymer saponified in the step (A); and (C) a step of applying the resin composition obtained in the step (B) to a porous membrane.

The steps (A) and (B) are as described above. Application in the step (C) is preferably carried out such that a layer containing a substance reversibly reacting with a carbon dioxide gas and the copolymer according to the present invention is formed on at least one surface of the porous membrane.

In order to facilitate application in the step (C), preferably, water is further mixed in the step (B). Namely, the resin composition supplied to the step (C) preferably contains water and it is more preferably in a form of an aqueous solution.

Application in the step (C) can be carried out with a normally industrially performed method, such as application with a coater (also called a doctor blade) or application with the use of a brush. A thickness of a layer of the composition can be controlled by adjusting a thickness of a membrane formed from the applied composition, a concentration of a copolymer and water in the resin composition, or an amount of or a ratio between a substance reversibly reacting with a carbon dioxide gas and the copolymer.

When the resin composition supplied to the step (C) contains water, in order to form a layer containing a substance reversibly reacting with a carbon dioxide gas and the copolymer according to the present invention on at least one surface of the porous membrane, the method of manufacturing the carbon dioxide gas separation membrane according to the present invention preferably further includes:

(D) a step of forming a composition layer by drying the applied composition; and (E) a step of subjecting the composition layer to heat treatment.

Drying in the step (D) refers to removal of water mainly contained in the applied composition. Such drying can be carried out by evaporating water from the applied membrane, for example, by natural drying at a room temperature and an atmospheric pressure, with heating means such as a thermostatic chamber or a hot plate or pressure reduction means such as a pressure reduction apparatus, or by combination of such means. Conditions for heating means or pressure reduction means can be selected as appropriate so long as gas permeability of a porous membrane is not lowered. For example, in a case of a thermostatic chamber or a hot plate, a temperature thereof is preferably set to be not higher than a melting point of the porous membrane. As for the pressure reduction means, after an application target is sealed in an appropriate pressure reduction device, an internal pressure in the pressure reduction device should only be set approximately to 1 to $1.0 \times 10^5$ Pa.

When a temperature in the heating means is within a range of a temperature for heat treatment in the step (E) which will be described later, the step (D) and the step (E) can successively be performed. For example, the applied composition can be dried in the step (D) and heat treatment in the step (E) can be carried out successively under the same temperature conditions.

Heat treatment in the step (E) is normally carried out with such heating means as a thermostatic chamber or a hot plate. A temperature for heat treatment is preferably within a range from 80° C. to 160° C. A time period for heat treatment is preferably within a range from 10 minutes to 4 hours, although the time period is dependent on a temperature for heat treatment. Through such heat treatment, the copolymer according to the present invention contained in a composition layer is normally cross-linked.

<Carbon Dioxide Gas Separation Membrane Module and Carbon Dioxide Gas Separation Apparatus>

The carbon dioxide gas separation membrane according to the present invention can be provided as a carbon dioxide gas separation membrane module. The carbon dioxide gas separation apparatus according to the present invention includes the carbon dioxide gas separation membrane according to the present invention or the carbon dioxide gas separation membrane module according to the present invention, and has means for separating and recovering a carbon dioxide gas or for separating and purifying a carbon dioxide gas.

The carbon dioxide gas separation membrane according to the present invention can suitably be employed as being modularized. An exemplary type of the module is exemplified by a spiral-wound type, a hollow fiber type, a pleated type, a tubular type, or a plate-and-frame type. The carbon dioxide gas separation membrane according to the present invention may be applied to a gas separation and recovery apparatus based on a membrane/absorption hybrid method used together with an absorbing solution as described, for example, in Japanese Patent Laying-Open No. 2007-297605.

EXAMPLES

Though the present invention will be described below with reference to Examples, the present invention is not limited thereto.

Synthesis Example 1

Synthesis of Vinyl Acetate-Methyl Acrylate Copolymer

In a 2-L volume reaction vessel including a stirrer, a thermometer, an $N_2$ gas introduction pipe, a reflux cooler, and dropping funnels, 768 g of water and 12 g of anhydrous sodium sulfate were introduced, and the inside of a system was replaced with an $N_2$ gas. In succession, 1 g of partially saponified polyvinyl alcohol (a degree of saponification of 88%) and 1 g of lauryl peroxide were introduced and an internal temperature was raised to 60° C. Thereafter, monomers of 104 g (1.209 mol) of methyl acrylate and 155 g (1.802 mol) of vinyl acetate were simultaneously dropped by using the dropping funnel for each monomer with 4 hours being spent. During dropping, stirring at the number of revolutions of 700 rpm was carried out and the internal temperature was held at 60° C. After dropping ended, stirring for 2 hours was further carried out at an internal temperature of 65° C. Thereafter, the obtained mixture was dehydrated by centrifugation and thus 288 g (a content of water being 10.4%) of a vinyl acetate-methyl acrylate copolymer was obtained.

Example 1

Manufacturing of Vinyl Alcohol-Cesium Acrylate Copolymer

In a 2-L volume reaction vessel including a stirrer, a thermometer, an $N_2$ gas introduction pipe, a reflux cooler, and dropping funnels, 500 g of methanol, 410 g of water, 554.2 g (3.3 mol) of cesium hydroxide monohydrate, and 288 g (a content of water being 10.4%) of the vinyl acetate-methyl acrylate copolymer obtained in Synthesis Example 1 were introduced, and saponification reaction was caused for 3 hours at 30° C. while stirring at 400 rpm was carried out. After saponification reaction ended, the obtained reaction mixture was washed three times with 600 g of methanol, filtrated, and dried at 70° C. for 6 hours. Thus, 308 g of a vinyl alcohol-cesium acrylate copolymer was obtained.

Three hundred and eight grams of the vinyl alcohol-cesium acrylate copolymer were crushed with a jet mill (LJ manufactured by Nippon Pneumatic Mfg, Co., Ltd.), and 280 g of the vinyl alcohol-cesium acrylate copolymer in a form of fine powders was obtained.

Example 2

Manufacturing of Resin Composition for Carbon Dioxide Gas Separation Membrane

Eighty grams of water were added to 2 g of the vinyl alcohol-cesium acrylate copolymer obtained in Example 1 (the constitutional unit derived from vinyl alcohol: the constitutional unit derived from cesium acrylate=60 mol %: 40 mol %) and stirred at a room temperature. Thereafter, 4.67 g of cesium carbonate was added and stirred for one day at a room temperature, and the resin composition for the carbon dioxide gas separation membrane was obtained.

Example 3

Manufacturing of Carbon Dioxide Gas Separation Membrane

The resin composition for the carbon dioxide gas separation membrane obtained in Example 2 was cast with an applicator onto a surface of a hydrophilic PTFE porous membrane (manufactured by Sumitomo Electric Fine Polymer, Inc., WPW-020-80, a membrane thickness of 80 μm, a pore diameter of 0.2 μm, and a porosity of approximately 75%). A gap between the applicator and the hydrophilic PTFE porous membrane was set to 360 μm. Then, the cast hydrophilic PTFE porous membrane was naturally dried for one day at a room temperature, and thereafter thermally cross-linked approximately for 2 hours at a temperature around 120° C. The carbon dioxide gas separation membrane was thus obtained.

Comparative Reference Example 1

Manufacturing of Vinyl Alcohol-Sodium Acrylate Copolymer

A vinyl alcohol-sodium acrylate copolymer was obtained as in Example 1 except for use of sodium hydroxide instead of cesium hydroxide monohydrate in Example 1.

Comparative Reference Example 2

Manufacturing of Resin Composition for Carbon Dioxide Gas Separation Membrane A resin composition for a carbon dioxide gas separation membrane was obtained as in Example 2 except for use in Example 2, of the vinyl alcohol-sodium acrylate copolymer obtained in Comparative Reference Example 1 instead of the vinyl alcohol-cesium acrylate copolymer obtained in Example 1.

Comparative Reference Example 3

Manufacturing of Carbon Dioxide Gas Separation Membrane

A carbon dioxide gas separation membrane was obtained as in Example 3 except for use in Example 3, of the resin composition for the carbon dioxide gas separation membrane obtained in Comparative Reference Example 2 instead of the resin composition for the carbon dioxide gas separation membrane obtained in Example 2.

Example 4

Carbon Dioxide Gas Separation Membrane Module, Carbon Dioxide Gas Separation Apparatus Including the Same, and Carbon Dioxide Gas Separation Method Using the Same The carbon dioxide gas separation membrane obtained in Example 3 was employed as a carbon dioxide gas separation membrane 10 and fixed between a feed side 12 and a permeation side 13 of a carbon dioxide gas separation membrane module 11 made of stainless steel. FIG. 1 shows a carbon dioxide gas separation apparatus including one carbon dioxide gas separation membrane module 11. A carbon dioxide gas was separated as follows, with the use of such a carbon dioxide gas separation apparatus.

A source gas (containing 23.6% of $CO_2$, 35.4% of $H_2$, and 41.0% of $H_2O$) was supplied to feed side 12 of carbon dioxide gas separation membrane module 11 at a flow rate of $3.47 \times 10^{-2}$ mol/min., and a sweep gas ($H_2O$ vapor) was supplied to permeation side 13 of carbon dioxide gas separation membrane module 11 at a flow rate of $7.77 \times 10^{-3}$ mol/min. Here, $H_2O$ was adjusted such that water was delivered by liquid delivery pumps 18 and 20 for delivering a constant amount of a liquid and heated and evaporated to achieve a ratio of mixing and a flow rate above. A pressure on feed side 12 was regulated to 600 kPaA by a back pressure regulator 15 provided downstream of a cooling trap 14 in a midpoint of an emission path for a retentate gas. A back pressure regulator 19 is provided also between a cooling trap 16 and a gas chromatograph 17, to thereby regulate a pressure on permeation side 13 to an atmospheric pressure. A flow rate of the gas after removal by cooling trap 16, of water vapor in the sweep gas emitted from permeation side 13 was quantified based on a result of analysis by gas chromatograph 17, so that permeance (mol/m² s kPa) of $CO_2$ and $H_2$ contained in the permeated gas was calculated and selectivity was found based on a ratio therebetween. Table 1 shows results.

Examples 5, 6, and 7

Carbon dioxide gas separation membrane module 11 was obtained as in Example 4 except that the vinyl alcohol-cesium acrylate copolymer obtained by saponifying the vinyl acetate-methyl acrylate copolymer obtained by dropping vinyl acetate and methyl acrylate in an amount of addition the same as or different from an amount in Synthesis Example 1 was employed and carbon dioxide gas separation membrane 10 obtained by repeating casting in Example 3 twice was employed, and a carbon dioxide gas was separated with the use of a carbon dioxide gas separation apparatus including one carbon dioxide gas separation membrane module 11. A ratio between the constitutional unit derived from vinyl alcohol (VA) and the constitutional unit derived from cesium acrylate (AA) in the vinyl alcohol-cesium acrylate copolymer was 80 mol %: 20 mol % (Example 5), 60 mol %: 40 mol % (Example 6), and 50 mol %: 50 mol % (Example 7). Table 1 shows results. In Table 1, a "degree of saponification" represents in percentage, a ratio of a total content of the constitutional unit derived from vinyl alcohol (VA) (the constitutional unit (1)) and the constitutional unit derived from cesium acrylate (AA) (the constitutional unit (2)) to the total content of all constitutional units constituting the vinyl alcohol-cesium acrylate copolymer.

Comparative Example 1

Carbon dioxide gas separation membrane module 11 was obtained as in Example 4 except for use in Example 4, of the carbon dioxide gas separation membrane obtained in Comparative Reference Example 3 as carbon dioxide gas separation membrane 10, and a carbon dioxide gas was separated with the use of a carbon dioxide gas separation apparatus including one carbon dioxide gas separation membrane module 11. Table 1 shows results.

TABLE 1

|  | Example 4 | Example 5 | Example 6 | Example 7 | Comparative Example 1 |
|---|---|---|---|---|---|
| VA:AA | 60:40 | 80:20 | 60:40 | 50:50 | 60:40 |
| The Number of Times of Casting | 1 | 2 | 2 | 2 | 1 |
| Degree of Saponification | 88 | 91 | 84 | 85 | 85 |
| $CO_2$ Permeance [mol/(m² s kPa)] | $3.72 \times 10^{-5}$ | $3.64 \times 10^{-5}$ | $4.00 \times 10^{-5}$ | $2.99 \times 10^{-5}$ | $2.68 \times 10^{-5}$ |
| $CO_2/H_2$ Selectivity | 105.6 | 46.9 | 111.4 | 118.0 | 74.1 |

INDUSTRIAL APPLICABILITY

With the use of the copolymer according to the present invention, a carbon dioxide gas separation membrane excellent in carbon dioxide gas permeation performance (permeance) can be manufactured.

REFERENCE SIGNS LIST 10 carbon dioxide gas separation membrane; 11 carbon dioxide gas separation membrane module (12 feed side, 13 permeation side); 14 and 16 cooling trap; 15 back pressure regulator; 17 gas chromatograph; 18 and 20 liquid delivery pump; and 19 back pressure regulator.

The invention claimed is:

1. A resin composition, comprising:
    a substance reversibly reacting with a carbon dioxide gas; and
    a copolymer, comprising:
    a constitutional unit (1) expressed in a formula (1) below:

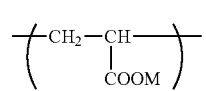

(1)

where M represents cesium; and
a constitutional unit (2) expressed in a formula (2) below:

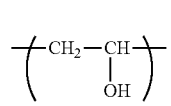

(2)

wherein a content of the constitutional unit (2) is from 1 mol % to 90 mol % with respect to a total content of the constitutional unit (1) and the constitutional unit (2),
the substance reversibly reacting with the carbon dioxide gas is cesium carbonate or cesium hydrogencarbonate, and
a content of the substance reversibly reacting with the carbon dioxide gas is within a range from 20 weight % to 90 weight % with respect to a total weight of the substance reversibly reacting with the carbon dioxide gas and the copolymer
wherein the copolymer comprises a constitutional unit (3) selected from the group consisting of a constitutional unit derived from methacrylic acid alkyl ester having an alkyl group having a carbon number from 1 to 16, a constitutional unit derived from maleic acid dialkyl ester having an alkyl group having a carbon number from 1 to 16, a constitutional unit derived from fumaric acid dialkyl ester having an alkyl group having a carbon number from 1 to 16, and a constitutional unit derived from itaconic acid dialkyl ester having an alkyl group having a carbon number from 1 to 16.

2. The resin composition according to claim 1, wherein the substance reversibly reacting with the carbon dioxide gas is cesium carbonate.

3. A carbon dioxide gas separation membrane in which a substance reversibly reacting with a carbon dioxide gas and a copolymer, comprising:
a constitutional unit (1) expressed in a formula (1) below:

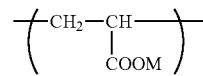

(1)

where M represents cesium; and
a constitutional unit (2) expressed in a formula (2) below:

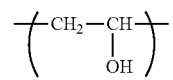

(2)

are supported by a porous membrane,
wherein a content of the constitutional unit (2) is from 1 mol % to 90 mol % with respect to a total content of the constitutional unit (1) and the constitutional unit (2),
the substance reversibly reacting with the carbon dioxide gas is cesium carbonate or cesium hyrdogencarbonate, and
a content of the substance reversibly reacting with the carbon dioxide gas is within a range from 20 weight % to 90 weight % with respect to a total weight of the substance reversibly reacting with the carbon dioxide gas and the copolymer
wherein the copolymer comprises a constitutional unit (3) selected from the group consisting of a constitutional unit derived from methacrylic acid alkyl ester having an alkyl group having a carbon number from 1 to 16, a constitutional unit derived from maleic acid dialkyl ester having an alkyl group having a carbon number from 1 to 16, a constitutional unit derived from fumaric acid dialkyl ester having an alkyl group having a carbon number from 1 to 16, and a constitutional unit derived from itaconic acid dialkyl ester having an alkyl group having a carbon number from 1 to 16.

4. A carbon dioxide gas separation membrane module, comprising the carbon dioxide gas separation membrane according to claim 3.

5. A carbon dioxide gas separation apparatus, comprising the carbon dioxide gas separation membrane according to claim 3.

* * * * *